(12) United States Patent
Wang

(10) Patent No.: US 12,262,374 B2
(45) Date of Patent: Mar. 25, 2025

(54) MAPPING BETWEEN LOGICAL CHANNELS AND CONFIGURED GRANT (CG) CONFIGURATIONS

(71) Applicant: Telefonaktiebolaget LM Ericsson (publ), Stockholm (SE)

(72) Inventor: Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 342 days.

(21) Appl. No.: 17/765,730

(22) PCT Filed: Aug. 11, 2020

(86) PCT No.: PCT/EP2020/072478
§ 371 (c)(1),
(2) Date: Mar. 31, 2022

(87) PCT Pub. No.: WO2021/063575
PCT Pub. Date: Apr. 8, 2021

(65) Prior Publication Data
US 2022/0417963 A1 Dec. 29, 2022

Related U.S. Application Data

(60) Provisional application No. 62/908,851, filed on Oct. 1, 2019.

(51) Int. Cl.
*H04W 72/23* (2023.01)
*H04W 72/0453* (2023.01)
(Continued)

(52) U.S. Cl.
CPC ... *H04W 72/1268* (2013.01); *H04W 72/0453* (2013.01); *H04W 72/23* (2023.01); *H04W 16/14* (2013.01)

(58) Field of Classification Search
None
See application file for complete search history.

(56) References Cited

U.S. PATENT DOCUMENTS

| 11,882,036 B2 * | 1/2024 | Lee | H04W 28/065 |
| 2020/0314681 A1 * | 10/2020 | Kuo | H04W 72/23 |

(Continued)

FOREIGN PATENT DOCUMENTS

| CN | 106233771 A | 12/2016 |
| CN | 110178435 A | 8/2019 |

(Continued)

OTHER PUBLICATIONS

Ericsson, "Reliability aspects in LCP restriction enhancement", Tdoc R2-1909374 (revision of R2-1906849), 3GPP TSG-RAN WG2 #107, Prague, Czech Republic, Aug. 26-30, 2019, www.3gpp.org/ftp/tsg_ran/WG2_RL2/TSGR2_107/Docs/R2-1909374.zip (6 pages).

(Continued)

*Primary Examiner* — Ajit Patel
(74) *Attorney, Agent, or Firm* — Rothwell, Figg, Ernst & Manbeck, P.C.

(57) ABSTRACT

A method (400) performed by a UE (600). The method includes the UE receiving (s402) a message transmitted by a base station, wherein the message comprises: i) logical channel, LCH, information identifying a LCH and ii) configured grant, CG, information identifying at least one CG configuration to which the LCH is mapped.

20 Claims, 7 Drawing Sheets

(51) Int. Cl.
*H04W 72/1268* (2023.01)
*H04W 16/14* (2009.01)

(56) References Cited

U.S. PATENT DOCUMENTS

| | | | | |
|---|---|---|---|---|
| 2020/0351931 | A1* | 11/2020 | Babaei | H04W 52/365 |
| 2020/0404697 | A1* | 12/2020 | Yang | H04W 72/23 |
| 2020/0413435 | A1* | 12/2020 | Chin | H04W 72/23 |
| 2021/0029720 | A1* | 1/2021 | Wang | H04W 72/23 |
| 2021/0227573 | A1* | 7/2021 | Fröberg Olsson | H04W 72/23 |
| 2022/0060292 | A1* | 2/2022 | Lee | H04L 1/189 |
| 2022/0209906 | A1* | 6/2022 | Han | H04W 72/23 |
| 2023/0284214 | A1* | 9/2023 | Yue | H04W 72/569 |
| | | | | 370/329 |

FOREIGN PATENT DOCUMENTS

| | | | | |
|---|---|---|---|---|
| WO | WO-2020127525 | A1 * | 6/2020 | H04W 72/044 |
| WO | WO-2020198499 | A1 * | 10/2020 | H04L 1/1812 |
| WO | WO-2020222215 | A1 * | 11/2020 | H04L 1/1887 |

OTHER PUBLICATIONS

CMCC, "Introducing multiple SPSs/CGs Configuration in RRC", R2-1904356, 3GPP TSG-RAN WG2 #105bis, Xi'an, China, Apr. 8-12, 2019, www.3gpp.org/ftp/tsg_ran/WG2_RL2/TSGR2_105bis/Docs/R2-1904356.zip (8 pages).

CMCC, "Outstanding Issues for multiple SPSs-CGs Support", R2-1904355, 3GPP TSG-RAN WG2 #105bis, Xi'an, China, Apr. 8-12, 2019, www.3gpp.org/ftp/tsg_ran/WG2_RL2/TSGR2_105bis/Docs/R2-1904355.zip (9 pages).

Ericsson, "On MAC aspects of multiple CG", Tdoc R2-1909385, 3GPP TSG-RAN WG2 #107, Prague, Czech Republic, Aug. 26-30, 2019, www.3gpp.org/ftp/tsg_ran/WG2_RL2/TSGR2_107/Docs/R2-1909385.zip (8 pages).

Vivo, "Other issues for URLLC", R1-1908164, 3GPP TSG RAN WG1#98, Prague, Czech Republic, Aug. 26-30, 2019, www.3gpp.org/ftp/tsg_ran/WG1_RL1/TSGR1_98/Docs/R1-1908164.zip (11 pages).

Intel Corporation, "Enhancements to configured grant PUSCH", R1-1808707, 3GPP TSG RAN WG1 #94, Gothenburg, Sweden, Aug. 20-24, 2018, www.3gpp.org/ftp/tsg_ran/WG1_RL1/TSGR1_94/Docs/R1-1808707.zip (6 pages).

International Search Report and Written Opinion dated Feb. 9, 2021 in International Application No. PCT/EP2020/072478 (17 pages).

MediaTek Inc., Multiple configured grants for NR-U, 3GPP TSG-RAN WG2 Meeting #104, R2-1816683 (Revision of R2-1813966), Spokane, US, Nov. 12-16, 2018 (3 pages).

Ericsson, "Logical Channel Prioritization and Transmission Profiles", 3GPP TSG-RAN WG2 #98-AH, Tdoc R2-1707119, Qingdao, P.R. of China, Jun. 27-29, 2017 (5 pages).

Ericsson, "Draft Channel Access Priority Class Configuration for Logical Channels," 3GPP TSG-RAN WG2 #107 R2-1910791, Prague, Czech Republic, Aug. 26-30, 2019 (4 pages).

ZTE et al., "Uu enhancements for NR V2X", 3GPP TSG-RAN WG2#104, R2-1816983, Spokane, USA, Nov. 12-16, 2018 (3 pages).

Qualcomm Incorporated, "Remaining Aspects of Configured Grant Transmission for NR-U", 3GPP TSG RAN WG2 Meeting #106, R2-1906414, Reno, USA, May 13-17, 2019 (5 pages).

Vivo, "Discussion on the enhancements to configured grants", 3GPP TSG RAN WG1 #98, R1-1908143, Prague, CZ, Aug. 26-30, 2019 (6 pages).

Huawei et al., "Transmission with configured grant in NR unlicensed band", 3GPP TSG RAN WGl Meeting #98, RI-1908112, Prague, Czech Republic, Aug. 26-30, 2019 (18 pages).

3GPP TS 38.331 V15.6.0 (Jun. 2019), 3rd Generation Partnership Project; Technical Specification Group Radio Access Network; NR; Radio Resource Control (RRC) protocol specification (Release 15) (519 pages).

Ericsson, "Configured grant enhancement", 3GPP TSG-RAN WG1 Meeting #98, R1-1909301, Prague, Czech Republic, Aug. 26-30, 2019 (6 pages).

MCC Support, "Final Report of 3GPP TSG RAN WG1 #97 v1.0.0 (Reno, USA, May 13-17, 2019)", 3GPP TSG RAN WG1 Meeting #98, R1-1907973, Prague, Czech Rep, Aug. 26-30, 2019 (163 pages).

3GPP TR 38.889 V16.0.0 (Dec. 2018), 3rd Generation Partnership Project; Technical Specification Group Radio Access Network; Study on NR-based access to unlicensed spectrum (Release 16) (119 pages).

3GPP TS 38.214 V15.6.0 (Jun. 2019), 3rd Generation Partnership Project; Technical Specification Group Radio Access Network; NR; Physical layer procedures for data (Release 15) (105 pages).

MCC Support, "Final Report of 3GPP TSG RAN WG1 #95 v1.0.0 (Spokane, USA, Nov. 12-16, 2018)", 3GPP TSG RAN WG1 Meeting #96, R1-1901482, Athens, Greece, Feb. 25-Mar. 1, 2019 (172 pages).

* cited by examiner

MAPPING BETWEEN LOGICAL CHANNELS AND CONFIGURED GRANT (CG) CONFIGURATIONS

CROSS REFERENCE TO RELATED APPLICATIONS

This application is a 35 U.S.C. § 371 National Stage of International Patent Application No. PCT/EP2020/072478, filed Aug. 11, 2020, which claims priority to U.S. provisional application No. 62/908,851, filed on Oct. 1, 2019. The above identified applications are incorporated by reference.

TECHNICAL FIELD

This disclosure relates to associating logical channels with configured grant (CG) configurations.

BACKGROUND

1. New Radio (NR) in Unlicensed Spectrum (NR-U)

The 5th generation of the cellular system, called New Radio (NR), is currently being standardized in 3GPP. NR is developed for maximum flexibility to support multiple and substantially different use cases. Besides the typical mobile broadband use case, other use cases include: machine type communication (MTC), ultra-low latency critical communications (URLCC), side-link device-to-device (D2D), etc.

In NR, the basic scheduling unit is called a slot. A slot consists of 14 OFDM symbols for the normal cyclic prefix configuration. NR supports many different subcarrier spacing configurations and at a subcarrier spacing of 30 kHz the OFDM symbol duration is about 33 us. As an example, a slot with 14 symbols for the same subcarrier-spacing (SCS) is 500 us long (including cyclic prefixes).

NR also supports flexible bandwidth configurations for different UEs on the same serving cell. In other words, the bandwidth monitored by a particular UE and used for its control and data channels may be smaller than the carrier bandwidth. One or multiple bandwidth part configurations for each component carrier can be semi-statically signaled to a UE, where a bandwidth part consists of a group of contiguous physical resource blocks (PRBs). Reserved resources can be configured within the bandwidth part. The bandwidth of a bandwidth part equals, or is smaller than, the maximal bandwidth capability supported by a UE.

NR is targeting both licensed and unlicensed bands, and a work item named NR based Access to Unlicensed Spectrum (NR-U) was started in January 2019. Allowing unlicensed networks (i.e., networks that operate in shared spectrum (or unlicensed spectrum)) to effectively use the available spectrum is an attractive approach to increase system capacity. Although unlicensed spectrum does not match the qualities of the licensed regime, solutions that allow an efficient use of it as a complement to licensed deployments have the potential to bring great value to 3GPP network operators, and, ultimately, to the 3GPP industry as a whole. It is expected that some features in NR will need to be adapted to comply with the special characteristics of the unlicensed band as well as also different regulations. A subcarrier spacing of 15 or 30 kHz are the most promising candidates for NR-U OFDM numerologies for frequencies below 6 GHz.

When operating in unlicensed spectrum many regions in the world require a device to sense the medium as free before transmitting. This operation is often referred to as "listen before talk (LBT)." There are many different flavors of LBT, depending on which radio technology the device uses and which type of data it wants to transmit at the moment. Common for all flavors is that the sensing is done in a particular channel (corresponding to a defined carrier frequency) and over a predefined bandwidth. For example, in the 5 GHz band, the sensing is done over 20 MHz channels.

Many devices are capable of transmitting (and receiving) over a wide bandwidth including of multiple sub-bands/channels, e.g., LBT sub-band (i.e., the frequency part with bandwidth equals to LBT bandwidth). A device is only allowed to transmit on the sub-bands where the medium is sensed as free. Again, there are different varieties of how the sensing should be done when multiple sub-bands are involved.

In principle, there are two ways a device can operate over multiple sub-bands. One way is that the transmitter/receiver bandwidth is changed depending on which sub-bands that were sensed as free. In this setup, there is only one component carrier (CC) and the multiple sub-bands are treated as single channel with a larger bandwidth. The other way is that the device operates almost independent processing chains for each channel. Depending on how independent the processing chains are, this option can be referred to as either carrier aggregation (CA) or dual connectivity (DC).

2. Channel Access Procedure in NR Unlicensed Spectrum

Listen-before-talk (LBT) is designed for unlicensed spectrum co-existence with other radio access technologies (RATs). In this mechanism, a radio device applies a clear channel assessment (CCA) check (i.e. channel sensing) before any transmission. The transmitter involves energy detection (ED) over a time period compared to a certain threshold (ED threshold) in order to determine if a channel is idle. In case the channel is determined to be occupied, the transmitter performs a random back-off within a contention window before next CCA attempt. In order to protect the ACK transmissions, the transmitter must defer a period after each busy CCA slot prior to resuming back-off. As soon as the transmitter has gained access to a channel, the transmitter is only allowed to perform transmission up to a maximum time duration (namely, the maximum channel occupancy time (MCOT)). For QoS differentiation, a channel access priority based on the service type has been defined. For example, there are four LBT priority classes are defined for differentiation of contention window sizes (CWS) and MCOT between services.

3. Scheduling Schemes in NR-U

In NR-U, both configured scheduling and dynamic scheduling will be used.

3.1 Configured Scheduling

In NR, configured scheduling is used to allocate semi-static periodic assignments or grants for a UE. For uplink, there are two types of configured scheduling schemes: Type 1 and Type 2. For Type 1, configured grants (CGs) are configured via RRC signaling only. For Type 2, similar configuration procedure as SPS UL in LTE was defined—i.e., some parameters are preconfigured via RRC signaling and some physical layer parameters are configured via MAC scheduling procedure. The detail procedures can be found in 3GPP TS 38.321 V15.4.0. The configured uplink scheduling will be also used in NR unlicensed operation. For NR-U, the configured scheduling can improve the channel access probability for PUSCH transmission due to additional LBT for PDCCH transmission per UL grant is avoided and the UE can acquire channel for PUSCH transmission using a configured grant after LBT success. In this uplink transmission procedure, only single LBT procedure is needed compared to 3 LBT procedures (one for SR TX, one for PDCCH for UL grant and one for PUSCH TX) relying on SR/BSR procedure. This can significantly improve the channel access probability for PUSCH transmissions.

As captured in the 3GPP TR 38.889, for both Type 1 and Type 2, only initial HARQ transmission is allowed to use configured grant. The HARQ retransmission relies on dynamic grant which is indicated via PDCCH addressed to CS-RNTI.

In NR Rel-15, it is desirable to introduce further enhancements to license assisted access (feLAA) autonomous UL (AUL) type behavior. However, it is important to recognize that the baseline is Type1 and Type2 configured grants (CG). Hence one should consider what enhancements are needed over and above this baseline to enable the desired behavior. Like for SPS in LTE, the CG periodicity is RRC configured, and this is specified in the ConfiguredGrantConfig information element (IE), which is currently defined in 3GPP TS 38.331 V15.6.0 ("TS 38.331"). Different periodicity values are supported in NR Rel-15 depending on the subcarrier spacing. For example, for 15 and 30 kHz SCS, the following periodicities are supported, expressed in a number of OFDM symbols:

TABLE 1

15 kHz SCS
2, 7, and n*14 OFDM symbols
where n ∈ {1, 2, 4, 5, 8, 10, 16, 20,
32, 40, 64, 80, 128, 160, 320, 640}
30 kHz SCS TABLE 1-continued 2, 7, and n*14 OFDM symbols
where n ∈ {1, 2, 4, 5, 8, 10, 16, 20,
32, 40, 64, 80, 128, 160, 256, 320, 640, 1280}

For Type1 configured grants, in addition to the periodicity, the time domain allocation of PUSCH is configured purely via RRC signalling:

TABLE 2 timeDomainOffset: Provides a slot offset
with respect to SFN 0
timeDomainAllocation: Provides an index
into a table of 16 possible combinations of
PUSCH mapping type (TypeA or TypeB), start
symbol S for the mapping (S = OFDM symbol
0, 2, 4, or 8 within a slot), and length L of
the mapping (L = 4, 6, 8, 10, 12, or 14 OFDM symbols).

For the case of Type2 configured grants, the periodicity is configured by radio resource control (RRC) in the same way as for Type1, but the slot offset is dynamically indicated and is given by the slot in which the UE receives the Downlink Control Information (DCI) that activates the Type2 configured grant. In contrast to Type1, the time domain allocation of PUSCH is indicated dynamically by DCI via the time domain resource assignment field in the same way as for scheduled (non-CG) PUSCH. This DCI field indexes a table of start symbol and length (SLIV) values. The detailed configuration details of the RRC spec (i.e., TS 38.331) for configured grant is illustrated as below:

TABLE 3

```
ConfiguredGrantConfig ::= SEQUENCE {
    frequencyHopping              ENUMERATED {intraSlot, interSlot}        OPTIONAL,--Need S,
    cg-DMRS-Configuration         DMRS-UplinkConfig,
    mcs-Table                     ENUMERATED {qam256, qam64LowSE}         OPTIONAL,--Need S
    mcs-TableTransformPrecoder    ENUMERATED {qam256, qam64LowSE}         OPTIONAL,--Need S
    uci-OnPUSCH                   SetupRelease { CG-UCI-OnPUSCH }         OPTIONAL,--Need M
    resourceAllocation            ENUMERATED { resourceAllocationType0, resourceAllocationType1,
                                               dynamicswitch },
    rbg-Size                      ENUMERATED {config2}                    OPTIONAL,--Need S
    powerControlLoopToUse         ENUMERATED {n0, n1},
    p0-PUSCH-Alpha                P0-PUSCH-AlphaSetId,
    transformPrecoder             ENUMERATED {enabled, disabled}          OPTIONAL,--Need S
    nrofHARQ-Processes            INTEGER(1..16),
    repK                          ENUMERATED {n1, n2, n4, n8},
    repK-RV                       ENUMERATED {s1-0231, s2-0303, s3-0000}  OPTIONAL,--Need R
    periodicity                   ENUMERATED {
        sym2, sym7, sym1x14, sym2x14, sym4x14, sym5x14, sym8x14, sym10x14, sym16x14, sym20x14,
        sym32x14, sym40x14, sym64x14, sym80x14, sym128x14, sym160x14, sym256x14, sym320x14,
        sym512x14,sym640x14, sym1024x14, sym1280x14, sym2560x14, sym5120x14,
        sym6, sym1x12, sym2x12, sym4x12, sym5x12, sym8x12, sym10x12, sym16x12, sym20x12, sym32x12,
        sym40x12, sym64x12, sym80x12, sym128x12, sym160x12, sym256x12, sym320x12, sym512x12,
        sym640x12,sym1280x12, sym2560x12
    },
    configuredGrantTimer          INTEGER (1..64)           OPTIONAL,--Need R
    rrc-ConfiguredUplinkGrant     SEQUENCE {
        timeDomainOffset             INTEGER (0..5119),
        timeDomainAllocation         INTEGER (0..15),
        frequencyDomainAllocation    BIT STRING (SIZE(18)),
        antennaPort                  INTEGER (0..31),
        dmrs-SeqInitialization       INTEGER (0..1)     OPTIONAL,--Need R
        precodingAndNumberOfLayers   INTEGER (0..63),
        srs-ResourceIndicator        INTEGER (0..15)    OPTIONAL,--Need R
        mcsAndTBS                    INTEGER (0..31),
        frequencyHoppingOffset       INTEGER (1.. maxNrofPhysicalResourceBlocks-1) OPTIONAL,--Need R
        pathlossReferenceIndex       INTEGER (0..maxNrofPUSCH-PathlossReferenceRSs-1),
    } OPTIONAL, --Need R
    ...,
}
```

3.2 Autonomous Uplink Transmission (AUL)

AUL has been being developed in 3GPP. The AUL is to be designed based on the configured scheduling scheme in Rel-15. AUL will support autonomous retransmission using a configured grant. To support autonomous retransmission in uplink using a configured grant, in RAN2-105bis, it was determined to introduce a new timer to protect the HARQ procedure so that the retransmission can use the same HARQ process for retransmission as for the initial transmission after expiry of the timer.

For AUL, the serving gNB can also schedule retransmission for a UE when previous transmission using a configured grant fails.

As specified in the 3GPP TR 38.889 (V 16.0.0), in relation to the resource allocation, NR in unlicensed spectrum shall allow consecutive configured grant resources in time without any gaps in between the resources and non-consecutive configured grant resources (not necessarily periodic) with gaps in between the resources is beneficial and should be considered for NR in unlicensed spectrum.

As for potential solutions to providing flexibility on time domain resource allocation, bitmap based approach and NR Rel-15 based time domain resource allocation approach, which includes {periodicity, offset in the frame, start symbol and length of PUSCH and K-repetition signaling}, are identified as potential candidates. Additional aspects such as finer granularity of resource allocation, and multiple resources within a period may be considered for enhancing flexibility on time domain resource allocation.

At RAN1 #97, the following agreement has been made: "For configured grant time domain resource allocation, the mechanisms in Rel-15 (both Type 1 and Type 2) are extended so that the number of allocated slots following the time instance corresponding to the indicated offset can be configured." From this agreement, it is observed that configured scheduling in release 16 (Rel-16) may be able to provide consecutive configured resources in time domain spanning a number of slots. It is to be further studied on how to configure consecutive configured resources within a slot.

4. Logical Channels

The Medium Access Control (MAC) Layer provides services to the Radio Link Control (RLC) Layer on logical channels. To accommodate different kinds of data transfer services, multiple types of logical channels are defined each supporting transfer of a particular type of information. Each logical channel type is defined by what type of information is transferred. The MAC sublayer provides the control and traffic channels listed in the table below:

TABLE 4

Logical channels provided by MAC.

| Logical channel name | Acronym | Control channel | Traffic channel |
| --- | --- | --- | --- |
| Broadcast Control Channel | BCCH | X | |
| Paging Control Channel | PCCH | X | |
| Common Control Channel | CCCH | X | |
| Dedicated Control Channel | DCCH | X | |
| Dedicated Traffic Channel | DTCH | | X |

SUMMARY

In RAN1 #95 (see reference [2]) within the NR URLLC SI, the following agreement was made whereby a UE can be provided with multiple active configured grants: "Multiple active configured grant configurations for a given BWP of a serving cell should be supported at least for different services/traffic types and/or for enhancing reliability and reducing latency."

According to this agreement, it is learned that a UE in new releases (NR Rel-16 and beyond) can be provided with multiple active configured grants (CGs) even in a single serving cell. In the legacy releases (up to 3GPP Rel-15), a UE with V2X (vehicle to everything) capable can be configured with up to 8 configured grants for sideLinks.

The introduction of multiple configured grants provides for at least enhancing reliability and reducing latency of critical services. In addition, it is also being discussed to apply multiple configured grants for allowing the UE to switch to slot-based transmissions after initiating the channel occupancy time (COT) to minimize DMRS and UCI overhead in unlicensed spectrum (see reference [4]).

Given that a UE in new releases (NR Rel-16 and beyond) will be configured with multiple configured grants for different purposes, the existing framework of configured scheduling must be updated accordingly. The potential changes to the specifications are expected. For example, Signaling details in the RRC specification must be defined to configure the mapping relations between logical channels and configured grant (CG) configurations.

In the existing LCP procedure, the RRC parameter configuredGrantType1Allowed sets whether a configured grant Type 1 can be used for transmission of an LCH. This parameter would be insufficient for the UE with multiple Type 1 CG configurations in case we want to introduce more finer LCP mapping restriction for every CG grant. Accordingly, the existing logical channel prioritization (LCP) procedure may need to be enhanced to allow specific services/LCHs to be mapped to different configured grants.

Furthermore, during RAN1 #97 [3], the following agreement was also made: "For configured grant time domain resource allocation, the mechanisms in Rel-15 (both Type 1 and Type 2) are extended so that the number of allocated slots following the time instance corresponding to the indicated offset can be configured."

According to above agreements, it is observed that the existing CG functionalities in NR Rel-15 are going to be extended in Rel-16 to be able to provide consecutive configured resources in time domain spanning a number of time occasions either across slots or within a slot.

However, in existing CG framework, a UE can be configured to perform TB repetitions with a configured grant, i.e., repeat the TB across a configured number of consecutive occasions. This function is mainly applied for improving transmission reliability purpose. As specified in the 38.214 [5], the higher layer configured parameters repK and repK-RV (i.e., in the RRC IE ConfiguredGrantConfig) define the K repetitions to be applied to the transmitted transport block, and the redundancy version pattern to be applied to the repetitions. For both Type 1 and Type 2 PUSCH transmissions with a configured grant, when the UE is configured with repK>1, the UE shall repeat the TB across the repK consecutive slots applying the same symbol allocation in each slot. Therefore, a UE configured with repK>1 can repeat the TB with a configured grant across the repK consecutive slots, meaning that the TB is not allowed to be repeated across occasions within a slot. Therefore, combined with the new function that a UE can be provided with consecutive configured resources within a slot, a UE may therefore first transmit multiple new TBs in a slot before performing a repetition for a pending TB. For delay sensitive services, this is not efficient from delay perspective. An example of the issue is illustrated in FIG. 1.

In the example, the UE first transmits TB1, TB2, and TB3 using the three CG resources within a slot (i.e. slot "1"). The UE then later transmits the repeated TB1 in the next slot (i.e., slot "2"). Such behavior is acceptable for a delay insensitive service, but it may introduce extra latency for TB1 which may be not acceptable for a delay critical service, such as URLLC like service.

Considering these observations it is necessary to provide solutions. Accordingly, this disclosure embodiments focusing on how to configure a mapping relation between LCHs and CG configurations and embodiments focusing on how to handle a CG configuration with both repetition and multiple time occasions within a configuration periodicity.

In one aspect there is provided a first method performed by a UE (600). The first method includes receiving a message (e.g., RRC, MAC CE, DCI) transmitted by a base station, wherein a) the message comprises: i) logical channel, LCH, information identifying a LCH and ii) configured grant, CG, information identifying at least one CG configuration to which the LCH is mapped, and/or b) the message comprises: i) CG information identifying a CG configuration and ii) LCH information identifying at least one LCH to which the CG configuration is mapped.

In some embodiments the message is an RRC message that comprises a logical channel configuration information element, LogicalChannelConfigIE, associated with the LCH, and the LogicalChannelConfigIE comprises the CG information that identifies at least one CG configuration to which the LCH is mapped, the CG information included in the LogicalChannelConfigIE comprises a sequence of one or more CG configuration identifiers, and each CG configuration identifier included in the sequence of CG configuration identifiers identifies a CG configuration to which the LCH is mapped.

In some embodiments the message is an RRC message that comprises a logical channel configuration information element, LogicalChannelConfigIE, associated with the LCH, and the LogicalChannelConfigIE comprises the CG information that identifies at least one CG configuration to which the LCH is mapped, the CG information included in the LogicalChannelConfigIE comprises a set of bits (a.k.a., a bitmap), and each bit in the bit map corresponds to a CG configuration identifier (a.k.a., CG configuration index), and for each bit included in the set of bits, if the value of the bit is set to a first particular value (e.g., TRUE), then the CG configuration identifier corresponding to the bit identifies a CG configuration that is allowed to be used for the LCH, otherwise the CG configuration identifier corresponding to the bit identifies a CG configuration that is not allowed to be used for the LCH.

In some embodiments the message is an RRC message that comprises a CG configuration information element, ConfigGrantConfigIE, and the ConfigGrantConfigIE comprises the LCH information that identifies at least one LCH to which the CG configuration is mapped, the LCH information included in the ConfigGrantConfigIE comprises a sequence of one or more LCH identifiers, and each LCH identifier included in the sequence of LCH identifiers identifies an LCH that is mapped to the ConfigGrantConfigIE.

In some embodiments the message is an RRC message that comprises a CG configuration information element, ConfigGrantConfigIE and the ConfigGrantConfigIE comprises the LCH information that identifies at least one LCH to which the CG configuration is mapped, the LCH information included in the ConfigGrantConfigIE comprises a set of bits (a.k.a., a bitmap), and each bit in the bit map corresponds to a different LCH, and for each bit included in the set of bits, if the value of the bit is set to a first particular value (e.g., TRUE), then the LCH to which the bit corresponds is mapped to the ConfigGrantConfigIE, otherwise the LCH to which the bit corresponds is not mapped to the ConfigGrantConfigIE.

In some embodiments the message is an RRC message, a MAC control element (CE), or downlink control information (DCI).

In some embodiments, for a transmission of a transport block (TB) associated with a logical channel that is mapped to a set of two more CG configurations, the UE selects one of the CG configurations included in the set of CG configurations based on priority, load, listen-before-talk, and/or reliability values assigned to each of the CG configurations included in the set of CG configurations and then transmits the TB using a CG resource identified by the selected CG configuration.

In some embodiments, for a transmission of a TB associated with a logical channel that is mapped to a set of two more CG configurations, the UE selects one of the CG configurations included in the set of CG configurations, and then transmits to a base station control information indicating the selected CG configuration and the TB associated with the logical channel.

In some embodiments the method also includes the UE receiving from the base station a message indicating a CG configuration that is different than the selected CG configuration, wherein the base station transmitted the message after receiving the transmission of the TB.

In some embodiments, for a transmission of a TB data associated with a logical channel mapped to at least a first CG configuration and a second CG configuration, the UE initially selects the first CG configuration and transmits the TB in accordance with the first CG configuration and then selects the first CG configuration and retransmits the TB in accordance with the second CG configuration.

In some embodiments the method also includes the UE receiving a message (e.g., RRC, MAC CE, DCI) transmitted by a base station, wherein the message comprises repetition information indicating to the UE that the UE is permitted to transmit a transport block, TB, in a first slot and retransmit the TB in the first slot.

In another aspect there is a second method performed by the UE. The second method includes the receiving a message (e.g., RRC, MAC CE, DCI) transmitted by a base station, wherein the message comprises repetition information indicating to the UE that the UE is permitted to transmit a transport block, TB, in a first slot and retransmit the TB in the first slot.

In some embodiments the message is an RRC message that comprises a configured grant (CG) configuration information element, IE, and the repetition information is a parameter of the CG configuration IE.

In some embodiments the second method also includes the UE transmitting the TB during the first slot, and the UE retransmitting the TB during the first slot.

In some embodiments the second method also includes the UE transmitting the TB during the first slot, the UE determining that there is not enough time left (number of symbols left) in the first slot to retransmit the TB during the first slot, and as a result of determining that there is not enough number of symbols left in the first slot to retransmit the TB during the first slot, the UE retransmitting the TB during a second slot that follow the first slot.

In some embodiments the message further indicates a required time offset between the two consecutive TB repetition occasions.

In another aspect there is a first method performed by a base station. The first method includes the base station generating a message (e.g., RRC, MAC CE, DCI) and transmitting the message to a user equipment, UE, wherein a) the message comprises: i) logical channel, LCH, information identifying a LCH and ii) configured grant, CG, information identifying at least one CG configuration to which the LCH is mapped, and/or b) the message comprises: i) CG information identifying a CG configuration and ii) LCH information identifying at least one LCH to which the CG configuration is mapped.

In some embodiments the method also includes the base station receiving a transport block, TB, transmitted by the UE, wherein the UE transmitted the TB using a CG configuration selected by the UE for the transmission of the TB; and after receiving the TB, the base station transmitting to the UE a message indicating a CG configuration that is different than the CG configuration selected by the UE.

In some embodiments the method also includes the base station receiving a transport block, TB, transmitted by the UE, wherein the UE transmitted the TB using a first CG configuration selected by the UE for the transmission of the TB; and after receiving the TB transmitted by the UE, the base station receiving a retransmission of the TB, wherein the UE retransmitted the TB using a second CG configuration selected by the UE for the retransmission of the TB, wherein the second CG configuration is different than the first CG configuration.

In some embodiments the method also includes generating a message (e.g., RRC, MAC CE, DCI), wherein the message comprises repetition information indicating to the UE that the UE is permitted to transmit a transport block, TB, in a first slot and retransmit the TB in the first slot; and transmitting the message to a user equipment, UE.

In another aspect there is a second method performed by the base station. The second method includes the base station generating a message (e.g., RRC, MAC CE, DCI), wherein the message comprises repetition information indicating to the UE that the UE is permitted to transmit a transport block, TB, in a first slot and retransmit the TB in the first slot; and transmitting the message to a user equipment, UE.

In some embodiments, the message is an RRC message that comprises a configured grant (CG) configuration information element, IE, and the repetition information is a parameter of the CG configuration IE. In some embodiments, the message further indicates a required time offset between the two consecutive TB repetition occasions.

Advantages of the embodiments disclosed herein include better configuration flexibility of handling configured resources, better utilization of configured resources considering service QoS requirements, and setter satisfaction of QoS requirements of different services that share the same configured resource.

DETAILED DESCRIPTION

Figure 1:
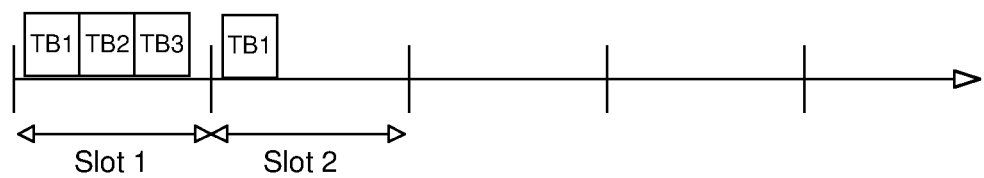
FIG. 1 illustrates a retransmission of a transport block.

The below embodiments are described in the context of NR unlicensed spectrum (NR-U), but the embodiments are not limited to NR-U scenarios. The embodiments are also applicable to other unlicensed operation scenarios such as LTE LAA/eLAA/feLAA/MulteFire. They are also applicable to licensed spectrum scenarios.

1. Mapping Between LCHs and CG Configs.
1.1 Provide the Mapping Information in an RRC IE In one embodiment, for a UE configured with multiple active CG configurations in an active bandwidth part (BWP), each logical channel (LCH) can be mapped to zero or more CG configurations, the mapping relation is defined in the RRC IE LogicalChannelConfig or the RRC IE ConfiguredGrantConfig. There are two options to configure the mapping relation.

1.1.1 Option 1

A sequence of IDs is included in the RRC IE LogicalChannelConfig or the RRC IE ConfiguredGrantConfig. In one example, a sequence of CG configuration indices (i.e., CG configuration identifier) are included in the LogicalChannelConfigIE indicating that these CG configurations are configured for the corresponding LCH. For example, as shown in table 5 below the parameter "allowedConfiguredGrants-List" is added to the LogicalChannelConfigIE and this parameter contains a list of up N number of identifies of type ConfiguredGrantConfigIndex, were N=maxNrofCGrants. In this embodiments, each ConfiguredGrantConfigIE includes an identifier of type ConfiguredGrantConfigIndex. Thus, if the allowedConfiguredGrants-List includes identifier "CG-Config-1," this the logical channel will be mapped to the ConfiguredGrantConfigIE that contains "CG-Config-1" in the identifier parameter of the ConfiguredGrantConfigIE.

TABLE 5

```
LogicalChannelConfig ::=        SEQUENCE {
    ul-SpecificParameters           SEQUENCE {
        priority                        INTEGER (1..16),
        prioritisedBitRate              ENUMERATED {kBps0, kBps8, kBps16, kBps32, kBps64,
                                            kBps128, kBps256, kBps512,
```

TABLE 5-continued

```
                                            kBps1024, kBps2048, kBps4096, kBps8192,
                                            kBps16384, kBps32768, kBps65536,
                                            infinity},
    bucketSizeDuration                      ENUMERATED {ms5, ms10, ms20, ms50, ms100, ms150,
                                            ms300, ms500, ms1000,
                                            spare7, spare6, spare5, spare4,
                                            spare3,spare2, spare1},
    allowedConfiguredGrants-List SEQUENCE (SIZE (1.. maxNrofCGrants) OF
                                                    ConfiguredGrantConfigIndex
                                                    OPTIONAL, -- Need R
    allowedServingCells                     SEQUENCE (SIZE (1..maxNrofServingCells-1)) OF ServCellIndex
                                                    OPTIONAL, -- PDCP-CADuplication
    allowedSCS-List                         SEQUENCE (SIZE (1..maxSCSs)) OF SubcarrierSpacing
                                                    OPTIONAL, -- Need R
    maxPUSCH-Duration                       ENUMERATED (ms0p02, ms0p04, ms0p0625, ms0p125, ms0p25,
ms0p5,
                                            spare2, spare1}
                                                    OPTIONAL, -- Need R
    configuredGrantType1Allowed ENUMERATED {true}
                                                    OPTIONAL, -- Need R
      logicalChannelGroup                   INTEGER (0..maxLCG-ID)
                                                    OPTIONAL, -- Need R
      schedulingRequestID                   SchedulingRequestId
                                                    OPTIONAL, -- Need R
      logicalChannelSR-Mask                 BOOLEAN,
      logicalChannelSR-DelayTimerApplied    BOOLEAN,
      ...,
      bitRateQueryProhibitTimer             ENUMERATED { s0, s0dot4, s0dot8, s1dot6, s3, s6,
                                            s12,s30}
                                                    OPTIONAL -- Need R
    }
                                                    OPTIONAL, -- Cond UL
    ...
}
```

In another example, a sequence of LCH indices are included in the ConfiguredGrantConfigIE indicating that these LCHs are mapped to this corresponding CG configuration. For example, as shown in table 6 below the parameter "allowedLCHs-list" is added to the ConfiguredGrantConfigIE. This parameter contains a list of logical channel identities, where each logical channel identities identifies a logical channel.

TABLE 6

```
ConfiguredGrantConfig ::=               SEQUENCE {
    frequencyHopping                    ENUMERATED {intraSlot, interSlot}
    cg-DMRS-Configuration               DMRS-UplinkConfig,
    mcs-Table                           ENUMERATED {qam256, qam64LowSE}
    mcs-TableTransformPrecoder ENUMERATED {qam256, qam64LowSE}
    uci-OnPUSCH                         SetupRelease { CG-UCI-OnPUSCH }
    resourceAllocation                  ENUMERATED { resourceAllocationType0,
                                                    resourceAllocationType1, dynamicSwitch
                                                    },
    rbg-Size            ENUMERATED {config2}
    powerControlLoopToUse       ENUMERATED {n0, n1},
    p0-PUSCH-Alpha      P0-PUSCH-AlphaSetId,
    transformPrecoder                   ENUMERATED {enabled, disabled}OPTIONAL, -- Need S
    nrofHARQ-Processes                  INTEGER(1. .16),
    repK                                ENUMERATED {n1, n2, n4, n8},
    repK-RV                             ENUMERATED {s1-0231, s2-0303, s3-0000} OPTIONAL, -- Need R
    periodicity                         ENUMERATED {sym2, sym7, sym1x14, sym2x14, sym4x14, sym5x14,
sym8x14,
                                            sym10x14, sym16x14, sym20x14,
                                            sym32x14, sym40x14, sym64x14, sym80x14, sym128x14,
                                            sym160x14, sym256x14, sym320x14, sym512x14,
                                            sym640x14, sym1024x14, sym1280x14, sym2560x14,
                                            sym5120x14, sym6, sym1x12, sym2x12, sym4x12, sym5x12,
                                            sym8x12, sym10x12, sym16x12, sym20x12, sym32x12,
                                            sym40x12, sym64x12, sym80x12, sym128x12, sym160x12,
                                            sym256x12, sym320x12, sym512x12, sym640x12,sym1280x12,
                                            sym2560x12
                                            },
      configuredGrantTimer              INTEGER (1..64)          OPTIONAL, -- Need R
      allowedLCHs-list                  SEQUENCE (SIZE (1.. maxLC-ID) OF
      LogicalChannelIdentity
                                                    OPTIONAL, -- Need R
      allowRepWithinSlot                BOOLEAN
      rrc-ConfiguredUplinkGrant         SEQUENCE {
        timeDomainOffset    INTEGER (0..5119),
```

TABLE 6-continued

```
    timeDomainAllocation            INTEGER (0..15),
    frequencyDomainAllocation       BIT STRING (SIZE(18)),
    antennaPort          INTEGER (0..31),
    dmrs-SeqInitialization          INTEGER (0..1)           OPTIONAL, -- Need R
    precodingAndNumberOfLayers      INTEGER (0..63),
    srs-ResourceIndicator           INTEGER (0..15)          OPTIONAL, -- Need R
    mcsAndTBS            INTEGER (0..31),
    frequencyHoppingOffset          INTEGER (1.. maxNrofPhysicalResourceBlocks-1)
                                        OPTIONAL, -- Need R
    pathlossReferenceIndex          INTEGER (0..maxNrofPUSCH-PathlossReferenceRSs-1),
    ...
    } OPTIONAL, -- Need R
    ...
}
CG-UCI-OnPUSCH ::= CHOICE {
    dynamicSEQUENCE (SIZE (1..4)) OF BetaOffsets,
    semiStatic           BetaOffsets
}
```

1.1.2 Option 2

A bitmap is included in the RRC LogicalChannelConfigIE or the RRC ConfiguredGrantConfigIE. The bitmap is a beneficial to reduce the RRC signaling overhead.

In one example, as shown in table 7 below, a bitmap of CG configurations is added in the LogicalChannelConfigIE. This bitmap is called "allowedCGSBmp." In the bitmap, each position is corresponding to a specific CG configuration. The below rules are applicable to each position in the bitmap: "1" indicates that the corresponding CG configuration is allowed to be used for the LCH; and "0" indicates that the corresponding CG configuration is not allowed to be used for the LCH.

TABLE 7

```
LogicalChannelConfig ::=                SEQUENCE {
    ul-SpecificParameters                   SEQUENCE {
        priority                                INTEGER (1..16),
        prioritisedBitRate                      ENUMERATED {kBps0, kBps8, kBps16, kBps32, kBps64,
                                                    kBps128, kBps256, kBps512,
                                                    kBps1024, kBps2048, kBps4096, kBps8192,
                                                    kBps16384, kBps32768, kBps65536,
                                                    infinity},
        bucketSizeDuration                      ENUMERATED {ms5, ms10, ms20, ms50, ms100, ms150,
                                                    ms300, ms500, ms1000,
                                                    spare7, spare6, spare5, spare4,
                                                    spare3,spare2, spare1},
        allowedCGSBmp                           BIT STRING (Size (maxNrofCGrants) OPTIONAL, -- Need R
        allowedServingCells                     SEQUENCE (SIZE (1..maxNrofServingCells-1)) OF
ServCellIndex
                                                                    OPTIONAL, -- PDCP-CADuplication
        allowedSCS-List                         SEQUENCE (SIZE (1..maxSCSs)) OF SubcarrierSpacing
                                                                    OPTIONAL, -- Need R
        maxPUSCH-Duration                       ENUMERATED {ms0p02, ms0p04, ms0p0625, ms0p125, ms0p25,
                                                    ms0p5, spare2, spare1}
                                                                    OPTIONAL, -- Need R
        configuredGrantType1Allowed ENUMERATED {true}
                                                                    OPTIONAL, -- Need R
        logicalChannelGroup                     INTEGER (0..maxLCG-ID)
                                                                    OPTIONAL, -- Need R
        schedulingRequestID                     SchedulingRequestId
                                                                    OPTIONAL, -- Need R
        logicalChannelSR-Mask                   BOOLEAN,
        logicalChannelSR-DelayTimerApplied      BOOLEAN,
        ...,
        bitRateQueryProhibitTimer               ENUMERATED { s0, s0dot4, s0dot8, s1dot6, s3,
                                                    s6, s12,s30}
                                                                    OPTIONAL -- Need R
    }
                                                                    OPTIONAL, -- Cond UL
    ...
}
```

In the second example, as shown in table 8, a bitmap of LCHs is added in the ConfiguredGrantConfig. This bitmap is called "allowedLCHsBmp." In the bitmap, each position is corresponding to a specific LCH. The below runes are applicable to each position in the bitmap: "1" indicates that the corresponding LCH is allowed to use the CG configuration; and "0" indicates that the corresponding LCH is not allowed to use the CG configuration.

bitmap. The allowed CGs bitmap would then indicate what CG configurations are mapped to the LCH identified by the LCH ID.

1.3 Control of LCP Procedure

In some embodiments, for each LCH mapped to one or multiple CG configurations, the RRC layer may control the LCP procedure by configuring mapping restrictions for each logical channel. Besides the existing mapping restrictions,

TABLE 8

```
ConfiguredGrantConfig ::=              SEQUENCE {
   frequencyHopping           ENUMERATED {intraSlot, interSlot}
   cg-DMRS-Configuration          DMRS-UplinkConfig,
   mcs-Table                ENUMERATED {qam256, qam64LowSE}
   mcs-TableTransformPrecoder         ENUMERATED {qam256, qam64LowSE}
   uci-OnPUSCH          SetupRelease { CG-UCI-OnPUSCH }
   resourceAllocation             ENUMERATED { resourceAllocationType0,
                                              resourceAllocationType1, dynamicSwitch
                                   },
   rbg-Size           ENUMERATED {config2}
   powerControlLoopToUse          ENUMERATED {n0, n1},
   p0-PUSCH-Alpha       P0-PUSCH-AlphaSetId,
   transformPrecoder              ENUMERATED {enabled, disabled}OPTIONAL, -- Need S
   nrofHARQ-Processes             INTEGER(1. .16),
   repK               ENUMERATED {n1, n2, n4, n8},
   repK-RV              ENUMERATED {s1-0231, s2-0303, s3-0000} OPTIONAL, -- Need R
   periodicity            ENUMERATED {sym2, sym7, sym1x14, sym2x14, sym4x14, sym5x14,
sym8x14,
                                   sym10x14, sym16x14, sym20x14,
                                   sym32x14, sym40x14, sym64x14, sym80x14, sym128x14,
                                   sym160x14, sym256x14, sym320x14, sym512x14,
                                   sym640x14, sym1024x14, sym1280x14, sym2560x14,
                                   sym5120x14, sym6, sym1x12, sym2x12, sym4x12, sym5x12,
                                   sym8x12, sym10x12, sym16x12, sym20x12, sym32x12,
                                   sym40x12, sym64x12, sym80x12, sym128x12, sym160x12,
                                   sym256x12, sym320x12, sym512x12, sym640x12,sym1280x12,
                                   sym2560x12
                                   },
   configuredGrantTimer         INTEGER (1..64)                OPTIONAL, -- Need R
   allowedLCHsBmp               BIT STRING (SIZE (maxLC-ID))       OPTIONAL, -- Need R
   allowRepWithinSlot           BOOLEAN
   rrc-ConfiguredUplinkGrant            SEQUENCE {
      timeDomainOffset       INTEGER (0..5119),
      timeDomainAllocation              INTEGER (0..15),
      frequencyDomainAllocation          BIT STRING (SIZE(18)),
      antennaPort         INTEGER (0..31),
      dmrs-SeqInitialization            INTEGER (0..1)       OPTIONAL, -- Need R
      precodingAndNumberOfLayers           INTEGER (0..63),
      srs-ResourceIndicator             INTEGER (0..15)      OPTIONAL, -- Need R
      mcsAndTBS          INTEGER (0..31),
      frequencyHoppingOffset                INTEGER (1.. maxNrofPhysicalResourceBlocks-1)
                                      OPTIONAL, -- Need R
      pathlossReferenceIndex            INTEGER (0..maxNrofPUSCH-PathlossReferenceRSs-1),
      ...
   } OPTIONAL,   -- Need R
   ...
}
CG-UCI-OnPUSCH ::= CHOICE {
   dynamicSEQUENCE (SIZE (1..4)) OF BetaOffsets,
   semiStatic   BetaOffsets
}
```

1.2 Provide the Mapping Information Using a Lower Layer Message

In another embodiment, a MAC CE or a DCI may be used to carry the information (e.g., bitmap or list) indicating the mapping relation between LCHs and CG configurations. For example, the MAC CE or the DCI signaling carries at least one ID of a CG configuration or a LCH and the associated the bitmap. In one example, the MAC CE or DCI signaling carries an ID of a CG configuration and the allowed LCHs bitmap. The allowed LCHs bitmap would then indicate what LCHs are mapped to the CG configuration identified by the CG configuration ID. In another example, the MAC CE or DCI signaling carries an ID of a LCH and the allowed CGs the UE MAC layer uses the allowedConfiguredGrants-List parameter to set an additional restriction which sets the allowed CG configurations for transmission for the associated logical channel.

According to this embodiment, when a new transmission associated with an UL grant is performed, the UE MAC entity shall:

1> select the logical channels for each UL grant that satisfies not only existing conditions (e.g., such as: a) the set of allowed Subcarrier Spacing index values in allowedSCS-List, if configured, includes the Subcarrier Spacing index associated to the UL grant; and b) maxPUSCH-Duration, if configured, is larger than or equal to the PUSCH transmission duration associated to the UL grant; and c) configuredGrantType1Allowed, if configured, is set to TRUE in case the UL grant is a Configured Grant Type 1; and d) allowedServingCells, if configured, includes the Cell information associated to the UL grant), but also an additional condition—the set of allowed CG grant/configuration index values in allowedConfiguredGrants-List, if configured, includes the grant/configuration index associated to the UL grant. That is, the UE MAC entity chooses for the UL transmission data associated with a logical channel that is mapped to the CG configuration identified in the UL grant.

1.4 Choosing a CG Config

In one embodiment, for each LCH configured with one or multiple CG configurations, the UE may choose to use the CG configuration for the LCH based on at least one of the conditions: a) choose the CG configuration with highest priority order (each CG configuration may be associated with a priority level), b) choose the CG configuration with lowest load (e.g., measured in a percentage of the occupied time occasions among all available time occasions), c) choose the CG configuration which can achieve best transmission reliability, d) choose the CG configuration that can pass the LBT operation.

As an example, if a LCH is mapped to three CG configuration, the UE will: determine the priority/load/reliability of each of these three CG configurations, select the one with the hightest priority or highest reliability or lowest load, and then transmit data associated with the LCH using resources identified by the selected CG configuration.

1.5 Base Station Choosing CG Configuration

In one embodiment, the UE may select a CG transmit for a PUSCH transmission and then send to the base station CG uplink control information (CG-UCI) that identifies the selected CG for the PUSCH transmission. After the base station receives the PUSCH transmission, the base station may indicate a different CG to the UE in a downlink signaling message (e.g., a DCI signaling carrying a grant, or a DFI carrying HARQ ACK feedback).

1.6 TB Retransmission

In one embodiment, for each LCH configured with one or multiple CG configurations, for a TB, the UE may use different CG configurations for retransmissions of the TB. Thus, for example, if a LCH is mapped to a set of two ore CG configurations, which set includes a first CG config and a second CG config, the UE may transmit a TB associated with the LCH using a CG resource identified by the first CG configuration and then retransmit that same TB using a CG resource identified by the second CG configuration.

2. TB Repetitions

In one embodiment, for a CG configuration supporting PUSCH TB repetitions, the base station (e.g., gNB) can configure whether or not the UE is allowed to perform repetitions for a TB within a slot. In case the UE is provided with multiple CG configurations, each configuration may be associated with a different setting on whether or not the UE is allowed to perform a TB repetition within a slot. For example, as shown in tables 6 and 8, a parameter named "allowRepWithinSlot" is added into the ConfiguredGrantConfigIE. This indicator may be a Boolean parameter. When it is set to "1," then the UE is allowed to perform TB repetition within a slot, otherwise, it is not allowed to perform TB repetition within a slot.

Figure 2A:
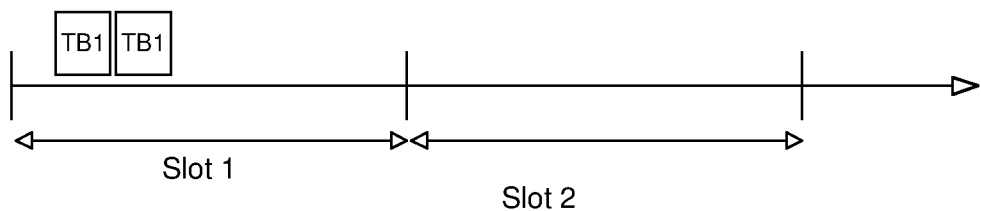
FIG. 2A illustrates a retransmission of a transport block according to one embodiment.
Figure 2B:
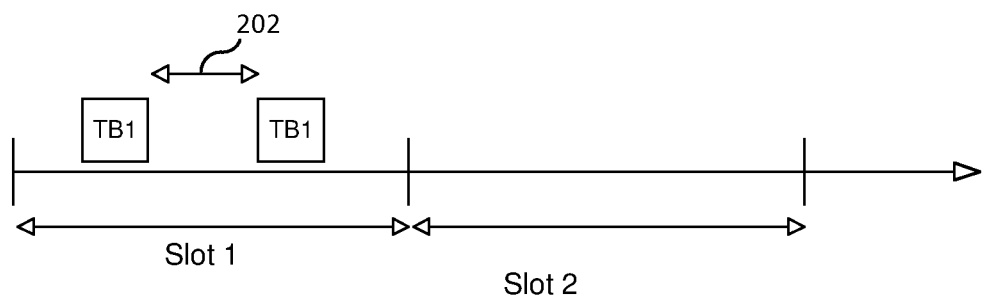
FIG. 2B illustrates a retransmission of a transport block according to one embodiment.

If the UE is allowed to perform TB repetition within a slot, then after the initial transmission of the TB within the slot, the UE may consecutively repeat the TB in the next OFDMs occupying the same length of consecutive symbols as the initial transmission. This is illustrated in FIG. 2A. In some embodiments, a time offset 202 (see FIG. 2B) between the two consecutive TB repetition occasions in the same slot may be configured. This is illustrated in FIG. 2B. This time offset value may be included in parameter within the ConfiguredGrantConfig IE.

Figure 2C:
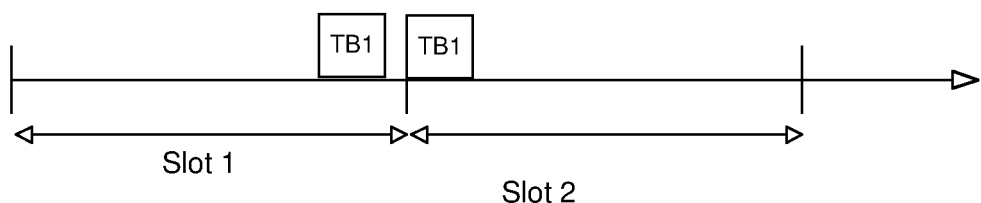
FIG. 2C illustrates a retransmission of a transport block according to one embodiment.
Figure 2D:
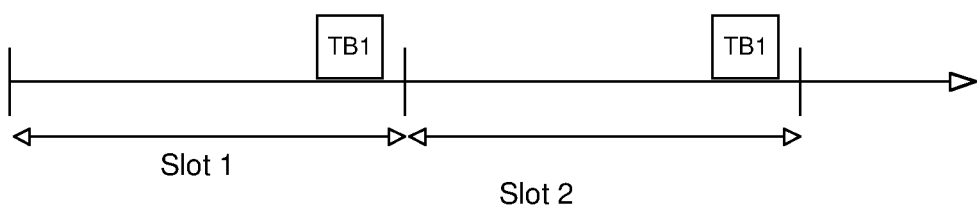
FIG. 2D illustrates a retransmission of a transport block according to one embodiment.

In one embodiment, The TB is not allowed to be repeated across the slot boundary. In other words, if the remaining symbols in the slot are not sufficient for the TB, the UE shifts the TB to the next slot. This is illustrated in FIG. 2C and FIG. 2D. The retransmitted TB (or "TB copy") may start from the first symbol of the next slot and span the same length of consecutive symbols as the initial transmission (illustrated in FIG. 2C). As another choice (illustrated in FIG. 2D), the UE uses the same parameter (e.g., start and length indicator (SLIV)) as the initial transmission to determine the time domain position (i.e., OFDM symbol positions) for the repeated TB in the next slot.

If the UE is allowed to perform TB repetition within a slot, then after the initial transmission of the TB within the first slot, the UE would repeat the TB in the next slot occupying the same time positions as the initial transmission. In other words, the UE behaves same as in the existing NR release (i.e., NR Rel-15).

In one embodiment, for a UE with a CG configuration, the UE may be configured to perform TB repetition with the CG grant (i.e., configured with repK>1). In addition, the UE may also be provided with N PUSCH time occasions with the CG grant within each CG period. In this case, during a CG period, the UE is able to transmit N different PUSCH TBs with the CG grant using different HARQ processes, at the same time, the UE is able to perform repetitions repK−1 times for every TB constrained in the CG period using the same HARQ process. The UE is configured to perform repetitions for every TB first or transmit N different TBs first during each CG period.

Figure 3A:
FIG. 3A illustrates a transmission of transport blocks according to one embodiment.

As a first option, the UE is configured to perform repetitions for a TB using the same HARQ process after the initial transmission before transmitting a second TB using a different HARQ process. This is illustrated in FIG. 3A. In the event that the time occasion for a repetition overlaps with another occasion (which is supposed to be used for transmission of a different TB), The UE may be configured to either drop the repetition occasion or the occasion for a different TB.

Figure 3B:
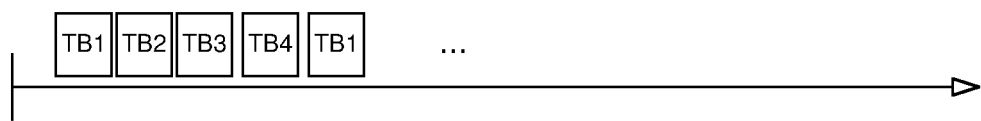
FIG. 3B illustrates a transmission of transport blocks according to one embodiment.

As a second option, the UE is configured to first transmit PUSCHs using N occasions, meaning the UE transmits a different TB for every occasion. After that, the UE can perform repetitions for every transmitted TB one by one. This is illustrated in FIG. 3B The first option may be beneficial for a UE with bad coverage. It is more urgent for the UE to get some data through. While the second option is more applicable to a UE with good coverage, the UE easily gets the data thorough via a single transmission attempt. The first option is also suitable for a service with low bit rate and/or sensitive latency requirement. The second option may be suitable to a delay insensitive service. Different CG configurations may be configured with different options.

There may be several way in which to configure the option that the UE shall apply. As one choice, an additional parameter named as "multiTxOccasionOpt" is added into the ConfiguredGrantConfig. This indicator is an Boolean parameter. It takes the value 0 meaning that the first option is set. It takes the value 1 meaning that the second option is set. As a second choice, which option should be applied for the UE is hard coded in the specification. As yet another choice, some UE rules on how to select the option is captured in the specification.

Summary of Various Embodiments

A1. A method (400, see FIG. 4A) performed by a UE (600), the method comprising: receiving (s402) a message (e.g., RRC, MAC CE, DCI) transmitted by a base station, wherein a) the message comprises: i) logical channel, LCH, information identifying a LCH and ii) configured grant, CG, information identifying at least one CG configuration to which the LCH is mapped, and/or b) the message comprises: i) CG information identifying a CG configuration and ii) LCH information identifying at least one LCH to which the CG configuration is mapped.

A2. The method of embodiment A1, wherein the message is an RRC message that comprises a logical channel configuration information element, LogicalChannelConfigIE, associated with the LCH, and the LogicalChannelConfigIE comprises the CG information that identifies at least one CG configuration to which the LCH is mapped, or the message is an RRC message that comprises a CG configuration information element, ConfigGrantConfigIE and the ConfigGrantConfigIE comprises the LCH information that identifies at least one LCH to which the CG configuration is mapped.

A3. The method of embodiment A1, wherein the message is an RRC message that comprises a logical channel configuration information element, LogicalChannelConfigIE, associated with the LCH, and the LogicalChannelConfigIE comprises the CG information that identifies at least one CG configuration to which the LCH is mapped, the CG information included in the LogicalChannelConfigIE comprises a sequence of one or more CG configuration identifiers, and each CG configuration identifier included in the sequence of CG configuration identifiers identifies a CG configuration to which the LCH is mapped.

A4. The method of embodiment A1, wherein the message is an RRC message that comprises a logical channel configuration information element, LogicalChannelConfigIE, associated with the LCH, and the LogicalChannelConfigIE comprises the CG information that identifies at least one CG configuration to which the LCH is mapped, the CG information included in the LogicalChannelConfigIE comprises a set of bits (a.k.a., a bitmap), and each bit in the bit map corresponds to a CG configuration identifier (a.k.a., CG configuration index), and for each bit included in the set of bits, if the value of the bit is set to a first particular value (e.g., TRUE), then the CG configuration identifier corresponding to the bit identifies a CG configuration that is allowed to be used for the LCH, otherwise the CG configuration identifier corresponding to the bit identifies a CG configuration that is not allowed to be used for the LCH.

A5. The method of embodiment A1, wherein the message is an RRC message that comprises a CG configuration information element, ConfigGrantConfigIE, and the ConfigGrantConfigIE comprises the LCH information that identifies at least one LCH to which the CG configuration is mapped, the LCH information included in the ConfigGrantConfigIE comprises a sequence of one or more LCH identifiers, and each LCH identifier included in the sequence of LCH identifiers identifies an LCH that is mapped to the ConfigGrantConfigIE.

A6. The method of embodiment A1, wherein the message is an RRC message that comprises a CG configuration information element, ConfigGrantConfigIE and the ConfigGrantConfigIE comprises the LCH information that identifies at least one LCH to which the CG configuration is mapped, the LCH information included in the ConfigGrantConfigIE comprises a set of bits (a.k.a., a bitmap), and each bit in the bit map corresponds to a different LCH, and for each bit included in the set of bits, if the value of the bit is set to a first particular value (e.g., TRUE), then the LCH to which the bit corresponds is mapped to the ConfigGrantConfigIE, otherwise the LCH to which the bit corresponds is not mapped to the ConfigGrantConfigIE.

A7. The method of any one of embodiments A1-A6, wherein the message is an RRC message, a MAC control element (CE), or downlink control information (DCI).

A8. The method of any one of embodiments A1-A7, wherein, for a transmission of a transport block (TB) associated with a logical channel that is mapped to a set of two more CG configurations, the UE selects (s404) one of the CG configurations included in the set of CG configurations based on priority, load, listen-before-talk, and/or reliability values assigned to each of the CG configurations included in the set of CG configurations and then transmits the TB using a CG resource identified by the selected CG configuration.

A9. The method of any one of embodiments A1-A8, wherein, for a transmission of a TB associated with a logical channel that is mapped to a set of two more CG configurations, the UE selects one of the CG configurations included in the set of CG configurations, and then transmits to a base station control information indicating the selected CG configuration and the TB associated with the logical channel.

A10. The method of embodiment A9, further comprising the UE receiving from the base station a message indicating a CG configuration that is different than the selected CG configuration, wherein the base station transmitted the message after receiving the transmission of the TB.

A11. The method of any one of embodiments A1-A10, wherein, for a transmission of a TB data associated with a logical channel mapped to at least a first CG configuration and a second CG configuration, the UE initially selects the first CG configuration and transmits the TB in accordance with the first CG configuration (s404) and then selects the second CG configuration and retransmits the TB in accordance with the second CG configuration (s406).

A12. The method of any one of embodiments A1-A11, further comprising: receiving (s502) a message (e.g., RRC, MAC CE, DCI) transmitted by a base station, wherein the message comprises repetition information indicating to the UE that the UE is permitted to transmit a transport block, TB, in a first slot and retransmit the TB in the first slot.

Figure 5A:
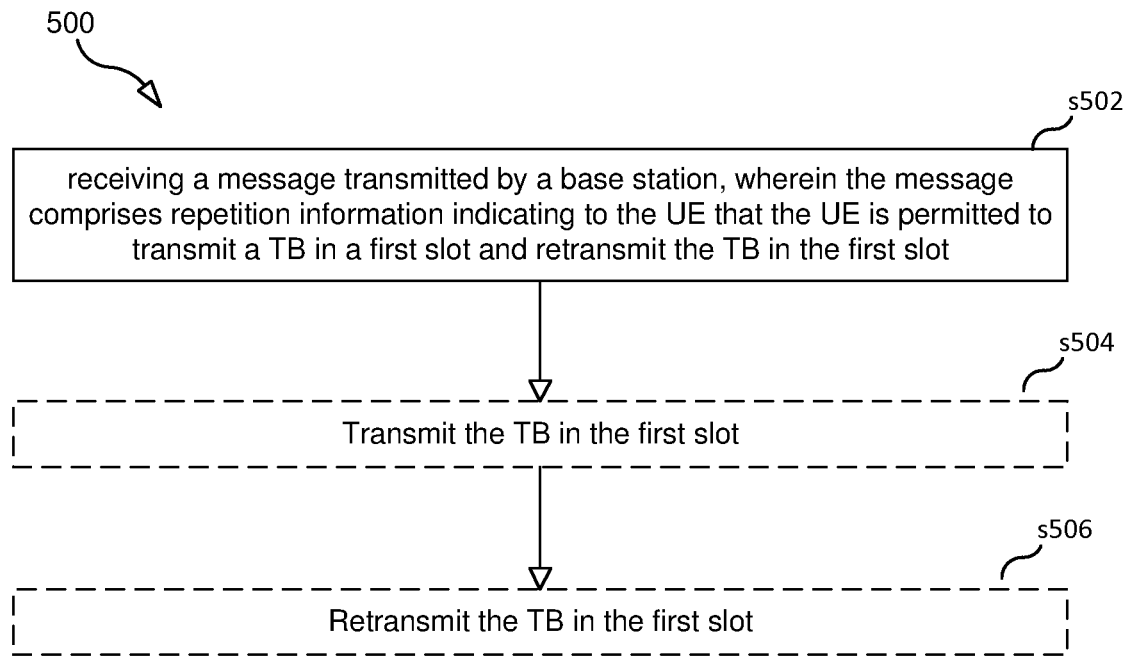
FIG. 5A is a flowchart illustrating a process according to an embodiment.

B1. A method (500, see FIG. 5A) performed by a UE (600), the method comprising: receiving (s502) a message (e.g., RRC, MAC CE, DCI) transmitted by a base station, wherein the message comprises repetition information indicating to the UE that the UE is permitted to transmit a transport block, TB, in a first slot and retransmit the TB in the first slot.

B2. The method of embodiment A12 or B1, wherein the message is an RRC message that comprises a configured grant (CG) configuration information element, IE, and the repetition information is a parameter of the CG configuration IE.

B3. The method of embodiment A12, B1, or B2, further comprising: the UE transmitting the TB during the first slot (s504), and the UE retransmitting the TB during the first slot (s506).

B4. The method of embodiment A12, B1, or B2, further comprising: the UE transmitting the TB during the first slot, the UE determining that there is not enough number of symbols left in the first slot to retransmit the TB during the first slot, and as a result of determining that there is not enough number of symbols left in the first slot to retransmit the TB during the first slot, the UE retransmitting the TB during a second slot that follow the first slot.

B5. The method of any one of embodiments A12 or B1-B4, wherein the message further indicates a required time offset between the two consecutive TB repetition occasions.

B6. A method performed by a user equipment, UE, the method comprising: receiving configuration information for configuring the UE to perform transport block, TB, repetition with a configured grant, CG, grant; and receiving further configuration information for providing the UE with N, physical uplink shared channel, PUSCH, time occasions with the CG grant within a CG period.

B7. The method of embodiment B6, further comprising: during the CG period, transmitting N different PUSCH TBs with the CG grant.

B8. The method of embodiment B7, wherein the UE transmits the N different PUSCH TBs using different HARQ processes.

B9. The method of embodiment B8, wherein during the CG period, the UE is further configured to perform repetitions repK−1 times for every TB constrained in the CG period using the same HARQ process, wherein repK is a value signalled to the UE.

B10. The method of any of of embodiments B6-B9, wherein the UE is configured such that during the CG period: 1) the UE performs repetitions repK−1 times for every TB constrained using the same HARQ process prior to transmitting a different PUSCH TB using the configured grant, or 2) the UE transmits N different PUSCH TBs using the configured grant prior to performing repetitions repK−1 times for every TB, wherein repK is a value signalled to the UE.

B11. A method performed by a base station, the method comprising: configuring a user equipment, UE, to perform transport block, TB, repetition with a configured grant, CG, grant; and providing the UE with N, physical uplink shared channel, PUSCH, time occasions with the CG grant within a CG period.

B12. The method of embodiment B11, further comprising configuring the UE such that during the CG period the UE: 1) the UE performs repetitions repK−1 times for every TB constrained using the same HARQ process prior to transmitting a different PUSCH TB using the configured grant, or 2) the UE transmits N different PUSCH TBs using the configured grant prior to performing repetitions repK−1 times for every TB, wherein repK is a value signalled to the UE.

C1. A method (450, see FIG. 4B) performed by a base station (700), the method comprising: generating (s452) a message (e.g., RRC, MAC CE, DCI); and transmitting (s454) the message to a user equipment, UE, wherein a) the message comprises: i) logical channel, LCH, information identifying a LCH and ii) configured grant, CG, information identifying at least one CG configuration to which the LCH is mapped, and/or b) the message comprises: i) CG information identifying a CG configuration and ii) LCH information identifying at least one LCH to which the CG configuration is mapped.

C2. The method of embodiment C1, wherein the message is an RRC message that comprises a logical channel configuration information element, LogicalChannelConfigIE, associated with the LCH, and the LogicalChannelConfigIE comprises the CG information that identifies at least one CG configuration to which the LCH is mapped, or the message is an RRC message that comprises a CG configuration information element, ConfigGrantConfigIE and the ConfigGrantConfigIE comprises the LCH information that identifies at least one LCH to which the CG configuration is mapped.

C3. The method of embodiment C1, wherein the message is an RRC message that comprises a logical channel configuration information element, LogicalChannelConfigIE, associated with the LCH, and the LogicalChannelConfigIE comprises the CG information that identifies at least one CG configuration to which the LCH is mapped, the CG information included in the LogicalChannelConfigIE comprises a sequence of one or more CG configuration identifiers, and each CG configuration identifier included in the sequence of CG configuration identifiers identifies a CG configuration to which the LCH is mapped.

C4. The method of embodiment C1, wherein the message is an RRC message that comprises a logical channel configuration information element, LogicalChannelConfigIE, associated with the LCH, and the LogicalChannelConfigIE comprises the CG information that identifies at least one CG configuration to which the LCH is mapped, the CG information included in the LogicalChannelConfigIE comprises a set of bits (a.k.a., a bitmap), and each bit in the bit map corresponds to a CG configuration identifier (a.k.a., CG configuration index), and for each bit included in the set of bits, if the value of the bit is set to a first particular value (e.g., TRUE), then the CG configuration identifier corresponding to the bit identifies a CG configuration that is allowed to be used for the LCH, otherwise the CG configuration identifier corresponding to the bit identifies a CG configuration that is not allowed to be used for the LCH.

C5. The method of embodiment C1, wherein the message is an RRC message that comprises a CG configuration information element, ConfigGrantConfigIE, and the ConfigGrantConfigIE comprises the LCH information that identifies at least one LCH to which the CG configuration is mapped, the LCH information included in the ConfigGrantConfigIE comprises a sequence of one or more LCH identifiers, and each LCH identifier included in the sequence of LCH identifiers identifies an LCH that is mapped to the ConfigGrantConfigIE.

C6. The method of embodiment C1, wherein the message is an RRC message that comprises a CG configuration information element, ConfigGrantConfigIE and the ConfigGrantConfigIE comprises the LCH information that identifies at least one LCH to which the CG configuration is mapped, the LCH information included in the ConfigGrantConfigIE comprises a set of bits (a.k.a., a bitmap), and each bit in the bit map corresponds to a different LCH, and for each bit included in the set of bits, if the value of the bit is set to a first particular value (e.g., TRUE), then the LCH to which the bit corresponds is mapped to the ConfigGrantConfigIE, otherwise the LCH to which the bit corresponds is not mapped to the ConfigGrantConfigIE.

C7. The method of any one of embodiments C1-C6, wherein the message is an RRC message, a MAC control element (CE), or downlink control information (DCI).

C8. The method of any one of embodiments C1-C7, further comprising the base station receiving a transport block, TB, transmitted by the UE, wherein the UE transmitted the TB using a CG configuration selected by the UE for the transmission of the TB; and after receiving the TB, the base station transmitting to the UE a message indicating a CG configuration that is different than the CG configuration selected by the UE.

C9. The method of any one of embodiments C1-C7, further comprising: the base station receiving a transport block, TB, transmitted by the UE, wherein the UE transmitted the TB using a first CG configuration selected by the UE for the transmission of the TB; after receiving the TB transmitted by the UE, the base station receiving a retransmission of the TB, wherein the UE retransmitted the TB using a second CG configuration selected by the UE for the retransmission of the TB, wherein the second CG configuration is different than the first CG configuration.

C10. The method of any one of embodiments C1-C9, further comprising: generating (s552) a message (e.g., RRC, MAC CE, DCI), wherein the message comprises repetition information indicating to the UE that the UE is permitted to transmit a transport block, TB, in a first slot and retransmit the TB in the first slot; and transmitting (s554) the message to a user equipment, UE.

Figure 5B:
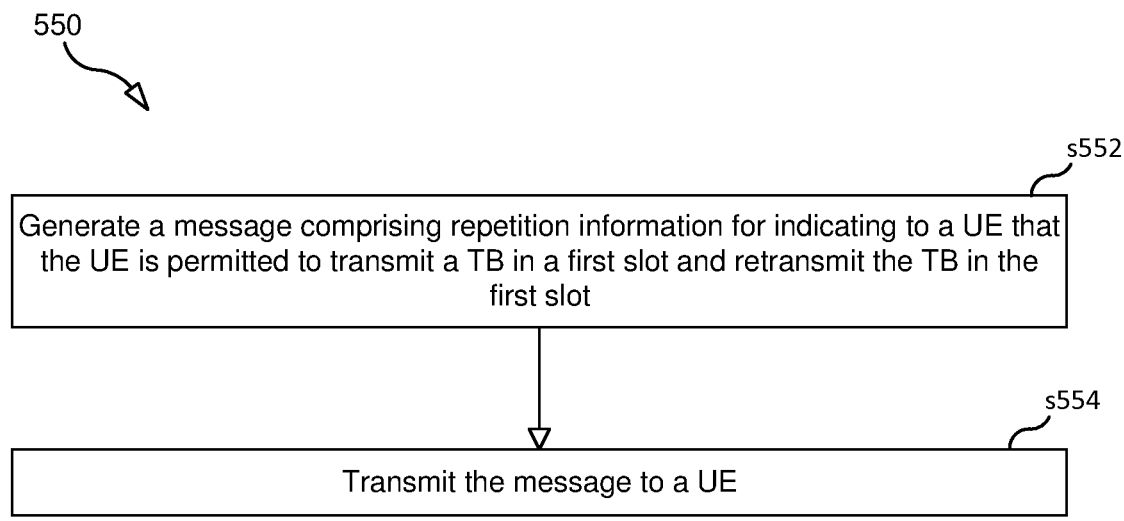
FIG. 5B is a flowchart illustrating a process according to an embodiment.

D1. A method (550, see FIG. 5B) performed by a base station (700), the method comprising: generating (s552) a message (e.g., RRC, MAC CE, DCI), wherein the message comprises repetition information indicating to the UE that the UE is permitted to transmit a transport block, TB, in a first slot and retransmit the TB in the first slot; and transmitting (s554) the message to a user equipment, UE.

D2. The method of embodiment D1, wherein the message is an RRC message that comprises a configured grant (CG) configuration information element, IE, and the repetition information is a parameter of the CG configuration IE.

D3. The method of embodiment D1 or D2, wherein the message further indicates a required time offset between the two consecutive TB repetition occasions.

E1. A computer program (643) comprising instructions (644) which when executed by processing circuitry (602) causes the processing circuitry (602) to perform the method of any one of the above embodiments.

E2. A carrier containing the computer program of embodiment E1, wherein the carrier is one of an electronic signal, an optical signal, a radio signal, and a computer readable storage medium (642).

F1. A UE (600) adapted to perform the method of any one of embodiments A1-B5.

G1. A UE (600), the UE comprising processing circuitry (602); and a memory (642), said memory containing instructions (644) executable by said processing circuitry, whereby said UE is operative to perform the method of any one of embodiments A1-B5.

H1. A base station (700) adapted to perform the method of any one of embodiments B6-D3.

I1. A base station (700), the base station comprising processing circuitry (702); and a memory (742), said memory containing instructions (744) executable by said processing circuitry, whereby said base station is operative to perform the method of any one of embodiments B6-D3.

Figure 6:
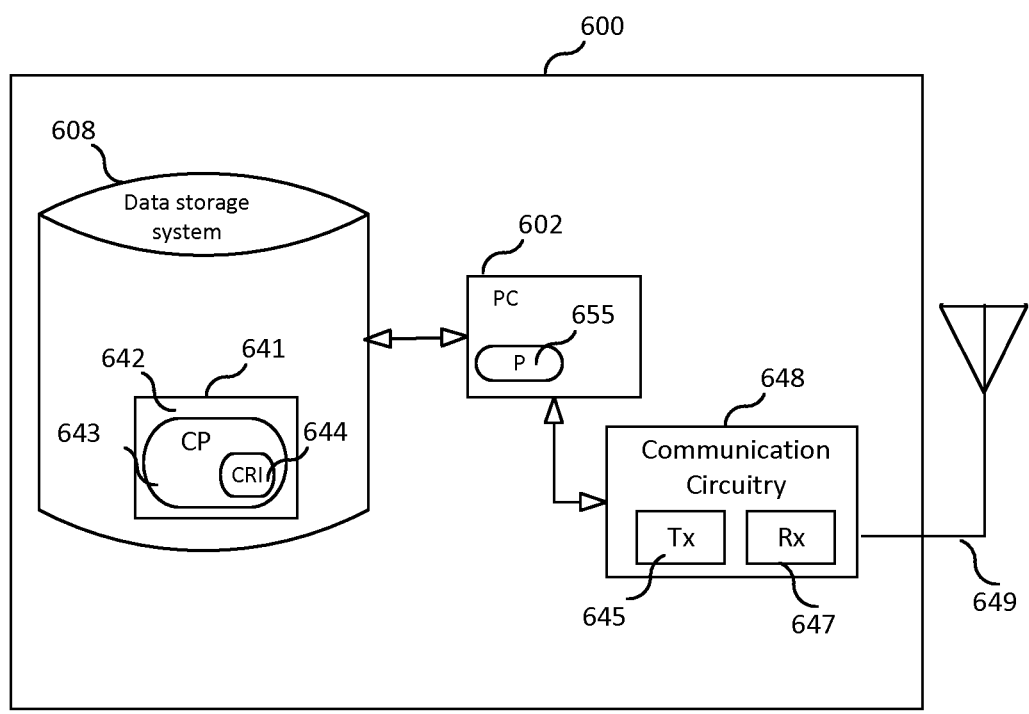
FIG. 6 is a block diagram of a UE according to an embodiment.

FIG. 6 is a block diagram of a UE 600, according to some embodiments. As shown in FIG. 6, UE 600 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like); communication circuitry 648, which is coupled to an antenna arrangement 649 comprising one or more antennas and which comprises a transmitter (Tx) 645 and a receiver (Rx) 647 for enabling UE 600 to transmit data and receive data (e.g., wirelessly transmit/receive data); and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes UE 600 to perform steps described herein (e.g., steps described herein with reference to the flow charts). In other embodiments, UE 600 may be configured to perform steps described herein without the need for code. That is, for example, PC 602 may consist merely of one or more ASICs. Hence, the features of the embodiments described herein may be implemented in hardware and/or software.

Figure 7:
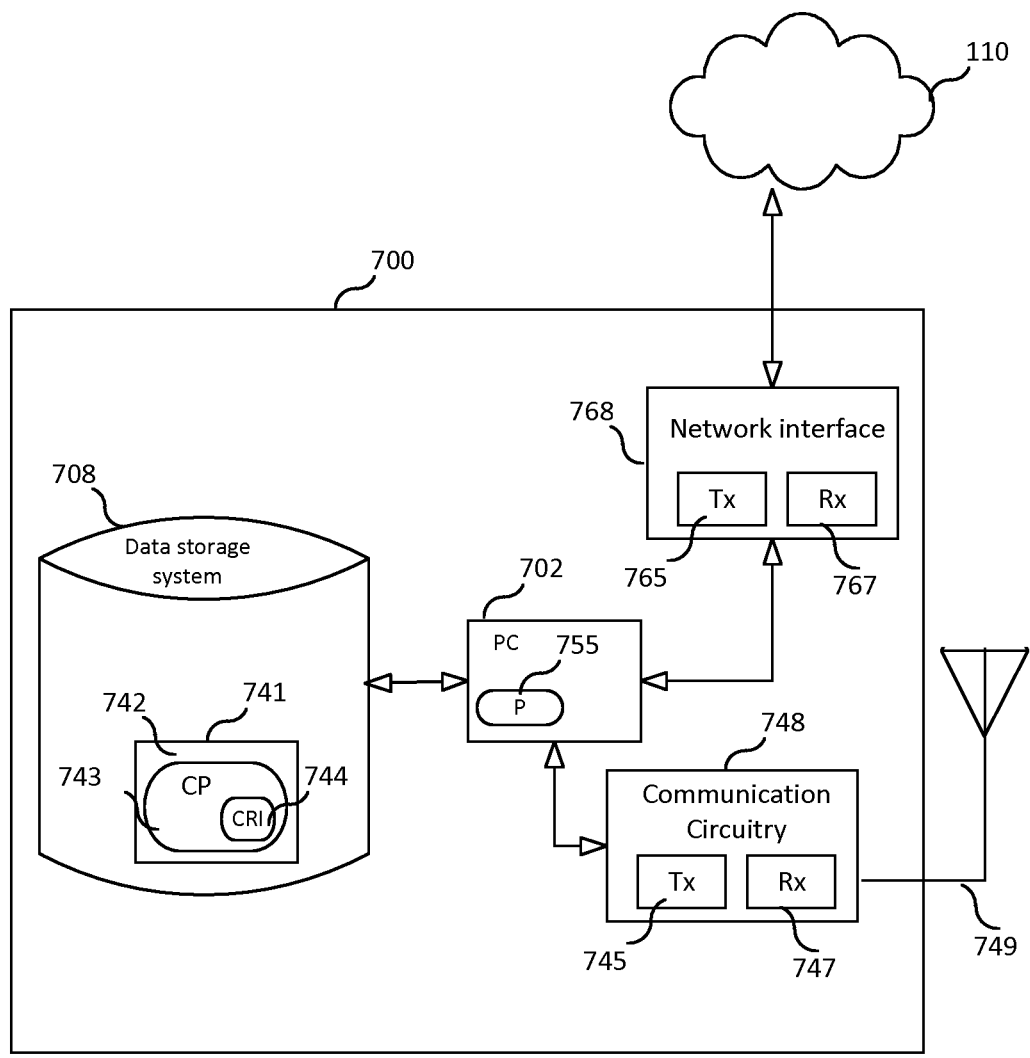
FIG. 7 is a block diagram of a base station according to an embodiment.

FIG. 7 is a block diagram of a base station 700, according to some embodiments. As shown in FIG. 7, the base station may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., base station 700 may be implemented using a distributed computing system); a network interface 768 comprising a transmitter (Tx) 765 and a receiver (Rx) 767 for enabling apparatus 700 to transmit data to and receive data from other nodes connected to a network 110 (e.g., an Internet Protocol (IP) network) to which network interface 748 is connected; communication circuitry 748, which is coupled to an antenna arrangement 749 comprising one or more antennas and which comprises a transmitter (Tx) 745 and a receiver (Rx) 747 for enabling the base station to transmit data and receive data (e.g., wirelessly transmit/receive data); and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes the base station to perform steps described herein (e.g., steps described herein with reference to the flow charts). In other embodiments, the base station may be configured to perform steps described herein without the need for code. That is, for example, PC 702 may consist merely of one or more ASICs. Hence, the features of the embodiments described herein may be implemented in hardware and/or software.

While various embodiments are described herein (including the Appendix), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] 3GPP TR 38.889 "Study on NR-based access to unlicensed spectrum, Release 16", v 16.0.0
[2] Chairman's Notes, 3GPP RAN1 WG #95, November 2018, www.3gpp.org/ftp/tsg_ran/WG1_RL1/TSGR1_95/Report/Final_Minutes_report_RAN1%2395_v100.zip
[3] Chairman's Notes, 3GPP RAN1 WG #97, April 2019, www.3gpp.org/ftp/tsg_ran/WG1_RL1/TSGR1_97/Report/Final_Minutes_report_RAN1%2397_v100. zip
[4] 3GPP R1-1909301, 3GPP RAN1 WG #98, Prague, Czech Republic, Aug. 26-30, 2019.
[5] 3GPP TS 38.214 V 15.6.0 "Physical layer procedures for data".

The invention claimed is:

1. A method performed by a user equipment (UE), the method comprising:
receiving a message transmitted by a base station, wherein the message comprises: i) logical channel (LCH) information identifying a LCH and ii) configured grant (CG) information identifying a set of two or more CG configurations to which the LCH is mapped, wherein the set of two or more CG configurations comprises a first CG configuration and a second CG configuration;
selecting the first CG configuration for transmitting a transport block (TB) associated with the LCH;
selecting the second CG configuration for retransmitting the TB; and
transmitting the TB in accordance with the first CG configuration.

2. The method of claim 1, wherein
the message is a Radio Resouce Control (RRC) message that comprises a logical channel configuration information element, LogicalChannelConfig IE, associated with the LCH, and the LogicalChannelConfig IE comprises the CG information that identifies at least one CG configuration to which the LCH is mapped.

3. The method of claim 2, wherein
the CG information comprises a sequence of one or more CG configuration identifiers, and
each CG configuration identifier included in the sequence of CG configuration identifiers identifies a CG configuration to which the LCH is mapped.

4. The method of claim 1 wherein the message is an RRC message, a MAC control element (CE), or downlink control information (DCI).

5. The method of claim 1, wherein the UE selects the first CG configuration based on priority, load, listen-before-talk, and/or reliability values assigned to each of the CG configurations included in the set of CG configurations.

6. The method of any claim 1, wherein the UE transmits to a base station control information indicating the first CG configuration and the TB associated with the logical channel.

7. The method of claim 6, further comprising, after transmission of the TB, the UE receiving from the base station a message indicating a CG configuration that is different than the first CG configuration.

8. The method of claim 1, further comprising: retransmitting the TB in accordance with the second CG configuration.

9. The method of claim 8, wherein the retransmission of the TB is performed using the same HARQ process as the initial transmission.

10. The method of claim 1, further comprising:
receiving a message transmitted by a base station, wherein the message comprises repetition information indicating to the UE that the UE is permitted to transmit a transport block, TB, in a first slot and retransmit the TB in the first slot.

11. A method performed by a base station, the method comprising:
generating a message;
transmitting the message to a user equipment (UE), wherein the message comprises: i) logical channel (LCH) information identifying a LCH and ii) configured grant (CG) information identifying a set of two or more CG configurations to which the LCH is mapped, wherein the set of two or more CG configurations comprises a first CG configuration and a second CG configuration;
receiving a transport block (TB) transmitted by the UE using a first CG configuration selected by the UE; and
receiving a retransmission of the TB, wherein the UE retransmitted the TB using a second CG configuration selected by the UE for the retransmission of the TB, and the second CG configuration is different than the first CG configuration.

12. The method of claim 11, wherein
the message is an RRC message that comprises a logical channel configuration information element, LogicalChannelConfig IE, associated with the LCH, and the LogicalChannelConfig IE comprises the CG information that identifies at least one CG configuration to which the LCH is mapped.

13. The method of claim 12, wherein
the CG information comprises a sequence of one or more CG configuration identifiers, and
each CG configuration identifier included in the sequence of CG configuration identifiers identifies a CG configuration to which the LCH is mapped.

14. The method of claim 11, wherein the message is a Radio Resource Control (RRC) message, a MAC control element (CE), or downlink control information (DCI).

15. The method of claim 11, further comprising
after receiving the TB, the base station transmitting to the UE a message indicating a CG configuration that is different than the first CG configuration selected by the UE.

16. The method of claim 11, wherein the retransmission of the TB is performed using the same HARQ process as the initial transmission.

17. The method of claim 11, further comprising:
generating a message, wherein the message comprises repetition information indicating to the UE that the UE is permitted to transmit a TB in a first slot and retransmit the TB in the first slot; and
transmitting the message to the UE.

18. A user equipment (UE), the UE comprising:
a receiver for receiving a message transmitted by a base station, wherein the message comprises: i) logical channel (LCH) information identifying a LCH and ii) configured grant (CG) information identifying a set of two or more CG configurations to which the LCH is mapped, wherein the set of two or more CG configurations comprises a first CG configuration and a second CG configuration;
processing circuitry configured to cause the UE to:
select the first CG configuration for transmitting a transport block (TB) associated with the LCH; and
select the second CG configuration for retransmitting the TB; and
a transmitter for transmitting the TB in accordance with the first CG configuration.

19. A base station, the base station comprising:
processing circuitry configured to generate a message comprising: i) logical channel (LCH) information identifying a LCH and ii) configured grant (CG) information identifying a set of two or more CG configurations to which the LCH is mapped, wherein the set of two or more CG configurations comprises a first CG configuration and a second CG configuration;
a transmitter for transmitting the message to a user equipment (UE);
a receiver for receiving a transport block (TB) transmitted by the UE using a first CG configuration selected by the UE; and
receiving a retransmission of the TB, wherein the UE retransmitted the TB using a second CG configuration selected by the UE for the retransmission of the TB, and the second CG configuration is different than the first CG configuration.

20. The method of claim 10, wherein the message further indicates a required time offset between transmitting the TB and retransmitting the TB.

* * * * *

UNITED STATES PATENT AND TRADEMARK OFFICE
CERTIFICATE OF CORRECTION

| | | |
|---|---|---|
| PATENT NO. | : 12,262,374 B2 | Page 1 of 1 |
| APPLICATION NO. | : 17/765730 | |
| DATED | : March 25, 2025 | |
| INVENTOR(S) | : Min Wang | |

It is certified that error appears in the above-identified patent and that said Letters Patent is hereby corrected as shown below:

On the Title Page

In Figure, for Tag "s404", Line 1, delete "two more" and insert -- two or more --, therefor.

In the Drawings

Figure 4A:
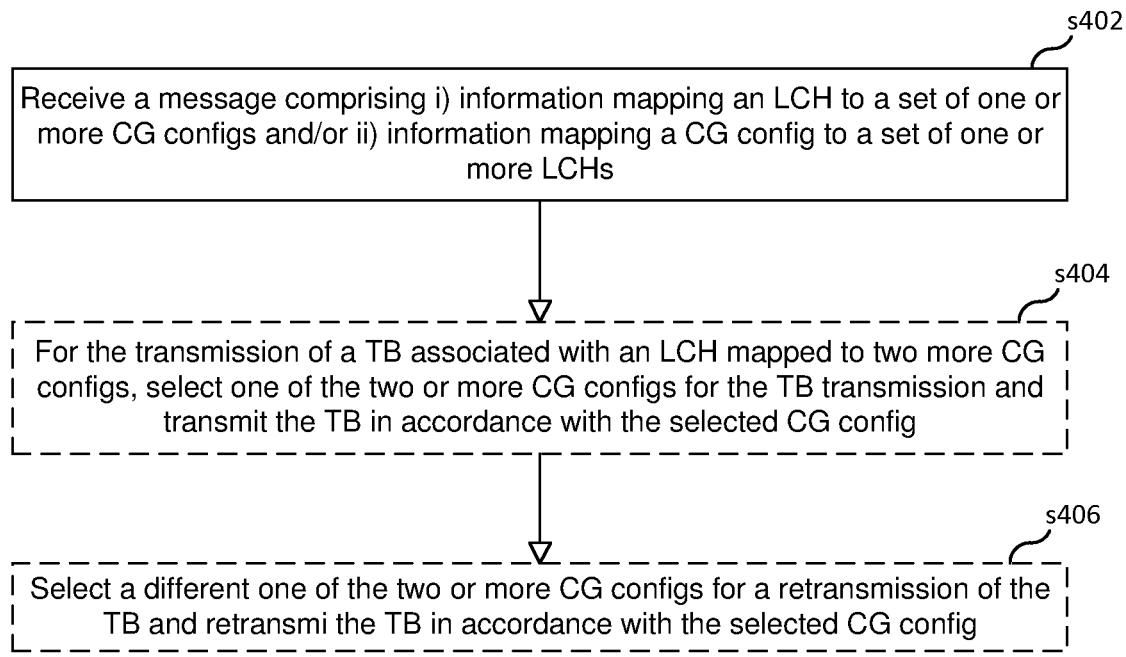
FIG. 4A is a flowchart illustrating a process according to an embodiment.
Figure 4B:
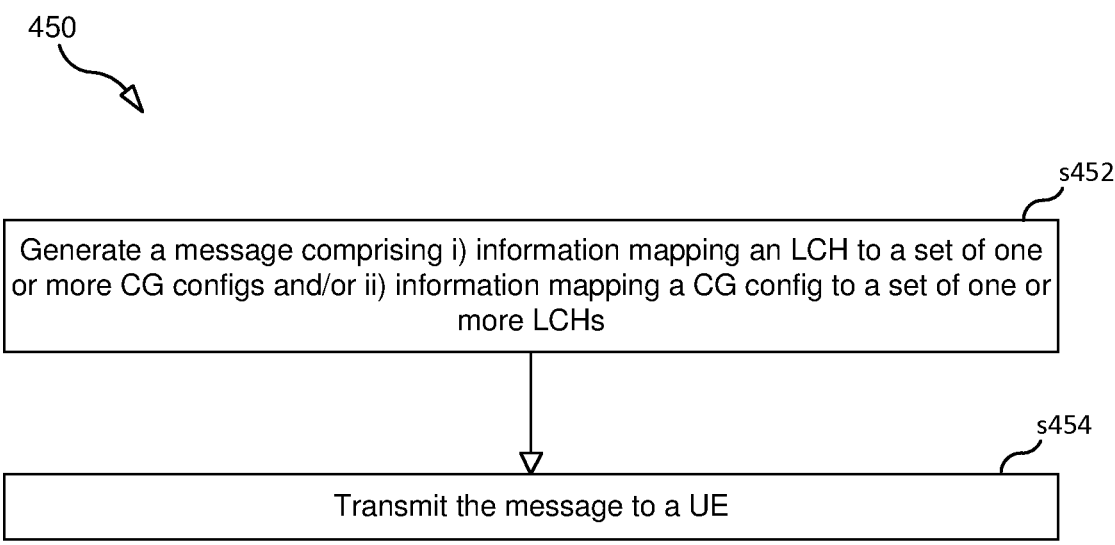
FIG. 4B is a flowchart illustrating a process according to an embodiment.

In FIG. 4A, Sheet 4 of 7, for Tag "s404", Line 1, delete "two more" and insert -- two or more --, therefor.

In the Specification

In Column 8, Line 13, delete "two more" and insert -- two or more --, therefor.

In Column 8, Lines 20-21, delete "two more" and insert -- two or more --, therefor.

In Column 8, Line 44, delete "the receiving" and insert -- the UE receiving --, therefor.

In Column 18, Line 51, delete "FIG. 3B" and insert -- FIG. 3B. --, therefor.

In Column 20, Line 24, delete "two more" and insert -- two or more --, therefor.

In Column 20, Line 33, delete "two more" and insert -- two or more --, therefor.

Signed and Sealed this
Twenty-third Day of September, 2025

John A. Squires
*Director of the United States Patent and Trademark Office*